(12) United States Patent
Leppänen et al.

(10) Patent No.: US 11,076,121 B2
(45) Date of Patent: Jul. 27, 2021

(54) APPARATUS AND ASSOCIATED METHODS FOR VIDEO PRESENTATION

(71) Applicant: NOKIA TECHNOLOGIES OY, Espoo (FI)

(72) Inventors: Jussi Leppänen, Tampere (FI); Miikka Vilermo, Siuro (FI); Arto Lehtiniemi, Lempäälä (FI); Antti Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/978,507

(22) PCT Filed: Mar. 19, 2019

(86) PCT No.: PCT/IB2019/052227
§ 371 (c)(1),
(2) Date: Sep. 4, 2020

(87) PCT Pub. No.: WO2019/180616
PCT Pub. Date: Sep. 26, 2019

(65) Prior Publication Data
US 2020/0404214 A1 Dec. 24, 2020

(30) Foreign Application Priority Data
Mar. 23, 2018 (EP) .................................. 18163521

(51) Int. Cl.
*H04N 5/783* (2006.01)
*G11B 27/034* (2006.01)
(Continued)

(52) U.S. Cl.
CPC ........... *H04N 5/783* (2013.01); *G11B 27/034* (2013.01); *G11B 27/34* (2013.01); *H04N 5/06* (2013.01)

(58) Field of Classification Search
CPC ........ H04N 5/783; H04N 5/06; G11B 27/034; G11B 27/34
See application file for complete search history.

(56) References Cited

U.S. PATENT DOCUMENTS

2016/0134988 A1  5/2016 Gorzel et al.

FOREIGN PATENT DOCUMENTS

CN  106 791 448 A  5/2017
EP  2 942 936 A1  11/2015
(Continued)

OTHER PUBLICATIONS

International Search Report and Written Opinion dated Jul. 2, 2019 corresponding to International Patent Application No. PCT/IB2019/052227.
(Continued)

*Primary Examiner* — Mishawn N. Hunter
(74) *Attorney, Agent, or Firm* — Squire Patton Boggs (US) LLP

(57) ABSTRACT

An apparatus configured to; based on first video content comprising video imagery being captured by a first camera of a device and second video content comprising video imagery being captured by a second camera of the same device, the first and second video content captured contemporaneously and based on a slow-motion-mode input selecting one of the first and second video content for playback in slow-motion, provide for simultaneous display of: a live, first preview comprising video imagery of a non-selected one of the first and second video content as it is captured and presented at a first play rate substantially equal to a capture rate at which the non-selected video content was captured; and a second preview comprising video imagery of the selected one of the first and second video content presented
(Continued)

at a second play rate slower than a capture rate at which the selected video content was captured.

17 Claims, 12 Drawing Sheets

(51) Int. Cl.
  *G11B 27/34* (2006.01)
  *H04N 5/06* (2006.01)

(56) References Cited

FOREIGN PATENT DOCUMENTS

| EP | 3 125 528 A2 | 2/2017 |
| EP | 3 337 160 A1 | 6/2018 |
| GB | 2 548 614 A | 9/2017 |
| WO | WO 2016/144549 A1 | 9/2016 |
| WO | WO 2016/172619 A1 | 10/2016 |
| WO | WO 2017/026793 A1 | 2/2017 |

OTHER PUBLICATIONS

Pulkki et al: "Spatial Sound Reproduction with Directional Audio Coding," JAES, AES, vol. 55, No. 6, Jun. 1, 2007, pp. 503-516, XP040508257.

APPARATUS AND ASSOCIATED METHODS FOR VIDEO PRESENTATION

TECHNICAL FIELD

The present disclosure relates to the field of video presentation and capture. The present disclosure also relates to associated apparatus, methods and computer programs Certain disclosed aspects/examples relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, smartwatches and tablet PCs.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture functions (e.g. using a (e.g. in-built) digital camera), and gaming functions.

BACKGROUND

Electronic devices are becoming more and more ubiquitous, with users interacting with electronics in many different ways. For example, people carry portable electronic devices with them in the form of smartphones, tablet computers, laptops, smart-watches and e-book readers.

It is common for electronic devices, such as smartphones or other portable electronic devices, to comprise at least two cameras. A first camera may be configured to point away from the user and is typically mounted on the back of the device (termed a rear facing camera) and a second camera may be configured to point towards the user and is typically mounted on the front of the device (termed a front facing camera). In one or more examples, both the first and second cameras may be used to capture video imagery contemporaneously for generation of composite video content comprising video content captured from both cameras.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In an aspect of the disclosure there is provided an apparatus, the apparatus comprising means configured to;
based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion,
provide for simultaneous display of:
a live, first preview comprising video imagery of a non-selected one of the first and second video content as it is captured and presented at a first play rate substantially equal to a capture rate at which the non-selected video content was captured; and
a second preview comprising video imagery of the selected one of the first and second video content presented at a second play rate slower than a capture rate at which the selected video content was captured.

In one or more examples, the apparatus comprises means configured to provide for recording of the first and second video content as composite video content for playback of the first and second video content together; wherein
the non-selected video content of the composite video content is configured for playback at the first play rate; and
the selected video content of the composite video content is configured for playback at the second play rate.

In one or more examples, the apparatus comprises means configured to provide for display of a graphical indicator illustrative of a temporal offset comprising an amount of time the selected video content currently provided for display as the second preview is behind the first preview.

In one or more examples, user input directed to the graphical indicator provides for adjustment of the temporal offset between first and second video content presented as the first preview and the second preview and based on said user input to select a new temporal offset, the apparatus comprises means configured to perform one of the following:
provide for changing of the second preview to present the selected video content corresponding to the new time point; and
provide for presentation, as the second preview, of the selected video content at a play rate greater than the capture rate at least until video imagery of the selected video content that corresponds to the new time point is reached.

In one or more examples, the apparatus comprises means configured to, based on an input indicative of a request to cease provision of the selected video content for playback in slow-motion, provide for display of the second preview comprising video imagery of the selected video content presented at a play rate substantially equal to the capture rate at which the selected video content was captured.

In one or more examples, the apparatus comprises means configured to, based on an input indicative of a request to temporally synchronize the first preview and the second preview;
provide for display of
the first preview comprising live video imagery of the first video content as the first video content is captured; and
the second preview comprising live video imagery of the second video content as the second video content is captured.

In one or more examples, the apparatus comprises means configured to:
based on the presence of a temporal offset between the first preview and the second preview due to presentation of the selected video content at the slower, second play rate than the capture rate at which it was captured while the non-selected video content was presented at the first play rate substantially equal to the capture rate at which the non-selected video content was captured and a time for which the slow-motion-mode was active; and based on a user input to select a new temporal offset less than a first temporal offset, the first temporal offset comprising the temporal offset at the time said user input was provided;

provide for recording of the first and second video content as composite video content for playback of the first and second video content together; wherein the selected video content is recorded with a discontinuity corresponding to the time period in the selected video content between the first temporal offset and the new temporal offset; and (ii) the selected video content of the composite video content is recorded such that the selected video content is configured for playback at a catch-up-play-rate greater than the capture rate at least until a time point in the selected video content that corresponds to the new time point is reached.

In one or more examples, the device is configured to capture spatial audio comprising audio captured with information indicative of the direction from which the audio was captured, and based on video direction information indicative of the direction in which the first video content and second video content is captured, the apparatus comprises means configured to perform the following:

associate, with the first video content, a first subset of the spatial audio having direction information corresponding to the direction in which the first video content was captured; and associate, with the second video content, a second subset, different to the first subset, of the spatial audio having direction information corresponding to the direction in which the second video content was captured.

In one or more examples, the first video content and the second video content each comprise associated audio content and in the first preview, the audio associated with the non-selected video is provided for presentation at the first play rate substantially equal to a capture rate at which the audio associated with the non-selected video was captured; and the audio associated with the selected video is provided for presentation at the second play rate slower than a capture rate at which the audio associated with the selected video was captured.

In one or more examples, the first video content and the second video content each comprise associated audio content and in the first preview, the audio associated with the non-selected video is recorded and configured for presentation at the first play rate substantially equal to a capture rate at which the audio associated with the non-selected video was captured; and the audio associated with the selected video is recorded and configured for presentation at the second play rate slower than a capture rate at which the audio associated with the selected video was captured.

In one or more examples, the first video content and the second video content each comprise associated audio content and based on a user-audio-selection-input that identifies one of the first and second video content, the apparatus is configured to present, in terms of the associated audio, the audio associated with only the video content selected by the user-audio-selection-input.

In one or more examples, the apparatus has means configured to provide for display, at least prior to receipt of the slow-motion-mode input, of a first user-actuatable slow-motion input graphic, which upon user-actuation is configured to provide for selection of the first video content for playback in slow-motion and a second user-actuatable slow-motion input graphic, which upon user-actuation is configured to provide for selection of the second video content for playback in slow-motion.

In one or more examples, the presentation of the second preview at a play rate slower than the capture rate at which the selected video content was captured is provided by one of:

based on the slow-motion-request input, increasing the rate at which the video imagery of the selected video content is captured from a first rate to a second, greater, rate, the selected video content configured for playback at the first rate;

based on the slow-motion-request input, and wherein the rate at which the video imagery of the selected video content is captured comprises a first rate, configuring the selected video content for playback at a third rate, slower than the first rate; and based on the slow-motion-request input, increasing the rate at which the video imagery of the selected video content is captured from a first rate to a second, greater, rate and configuring the selected video content for playback at a third rate, slower than the first rate.

In a second aspect there is provided a method, the method comprising:

based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, providing for simultaneous display of:

a live, first preview comprising video imagery of a non-selected one of the first and second video content as it is captured and presented at a first play rate substantially equal to a capture rate at which the non-selected video content was captured; and a second preview comprising video imagery of the selected one of the first and second video content presented at a second play rate slower than a capture rate at which the selected video content was captured.

In a third aspect there is provided a computer readable medium comprising computer program code stored thereon, the computer readable medium and computer program code being configured to, when run on at least one processor, perform the method of:

based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, providing for simultaneous display of:

a live, first preview comprising video imagery of a non-selected one of the first and second video content as it is captured and presented at a first play rate substantially equal to a capture rate at which the non-selected video content was captured; and a second preview comprising video imagery of the selected one of the first and second video content presented at a second play rate slower than a capture rate at which the selected video content was captured.

In a further example aspect there is provided an apparatus comprising:

at least one processor; and at least one memory including computer program code, the at least one memory and the computer program code configured to, with the at least one processor, cause the apparatus to perform at least the following:

based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, provide for simultaneous display of:

a live, first preview comprising video imagery of a non-selected one of the first and second video content as it is captured and presented at a first play rate substantially equal to a capture rate at which the non-selected video content was captured; and a second preview comprising video imagery of the selected one of the first and second video content presented at a second play rate slower than a capture rate at which the selected video content was captured.

The present disclosure includes one or more corresponding aspects, examples or features in isolation or in various combinations whether or not specifically stated (including claimed) in that combination or in isolation. Corresponding means and corresponding functional units (e.g., function enabler, preview renderer, image capture processor, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
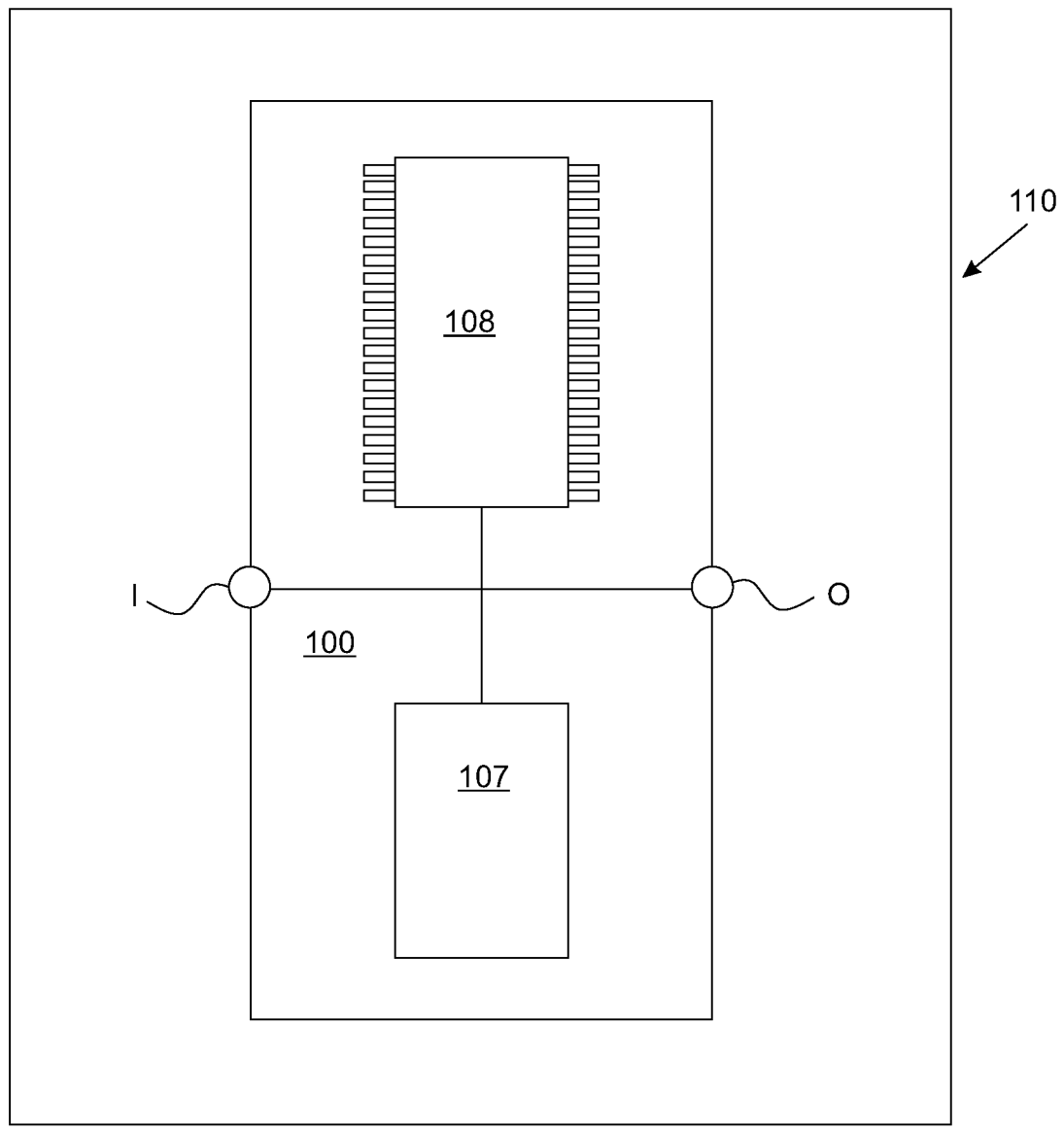
FIG. 1 illustrates an example apparatus for presentation of first and second previews for first and second video content.

Electronic devices and, in particular, portable electronic devices such as mobile telephones, including smartphones, may be provided with at least two cameras, typically comprising a rear facing camera a front facing camera. In one or more examples, both the first and second cameras may be used to capture video imagery contemporaneously for generation of composite video content comprising the video content captured from both cameras. The composite video content may present the video imagery from the first camera and the second camera in one or more of a side by side arrangement, a vertically stacked arrangement or a picture in picture arrangement or in any other arrangement in which the video imagery is displayed together. Such composite video content, given the first and second cameras typically point outwardly from a user and towards a user, may be used to record action occurring around the user as well as the reaction of the user at the same time. In other examples, the first and second cameras may be pointed towards first action occurring in a first part of a room or space and second action occurring at the same time but in a different, second part of a room or space.

Electronic devices and, in particular, portable electronic devices such as mobile telephones, including smartphones, may also be provided with functionality to capture slow-motion video content. The capture of slow-motion video may comprise capturing the imagery that forms the video at a greater rate and/or presenting the imagery that forms the video content at a slower rate or a combination of both, such that the user perceives action appearing in the video content occurring at a slower than real-time rate.

In one or more examples, device or apparatus may be provided that capture spatial audio. Spatial audio comprises audio presented in such a way to a user that it is perceived to originate from a particular location, as if the source of the audio was located at that particular location. Spatial audio content comprises audio for presentation as spatial audio and, as such, typically comprises audio having directional information (either explicitly specified as, for example, metadata or inherently present in the way the audio is captured), such that the spatial audio content can be presented so that its component audio is perceived to originate from one or more locations or directions around a listener in accordance with the directional information. In one or more examples, conventional audio delivered by headphones may be perceived as heard from inside a user's head, while presentation of spatial audio may be considered to "externalise" the audio such that it is perceived to originate from locations outside the user's head.

The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio.

Spatial audio may use one or more of volume differences, timing differences and pitch differences in the audio for audible presentation to each of a user's ears to create the perception that the origin of the audio is at a particular location or in a particular direction in space. The perceived distance to the perceived origin of the audio may be rendered by controlling the amount of reverberation and gain to indicate closeness or distance from the perceived source of the spatial audio.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose CPU of the device and the memory 107 is general purpose memory comprised by the device.

The input I allows for receipt of signalling to the apparatus 100 from further components, such as components of a portable electronic device (like a touch-sensitive or hover-sensitive display) or the like. The output O allows for onward provision of signalling from within the apparatus 100 to further components such as a display screen, speaker, or vibration module. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single unit.

The apparatus 100 may be part of a portable electronic device 110 having first and second cameras (not shown) for capturing first video content and second video content respectively. The portable electronic device 110 may comprise a display device such as, for example, a liquid crystal display (LCD), e-Ink or touch-screen user interface. The device 110 may be configured such that it may receive, include, and/or otherwise access data. For example, the device 110 may comprises a communications unit, such as a receiver, transmitter, and/or transceiver, in communication with an antenna for connecting to a wireless network and/or a port (not shown) for accepting a physical connection to a network, such that data may be received via one or more types of networks. It will be appreciated that, in certain example embodiments, the display device may incorporate the user interface.

Figure 2:
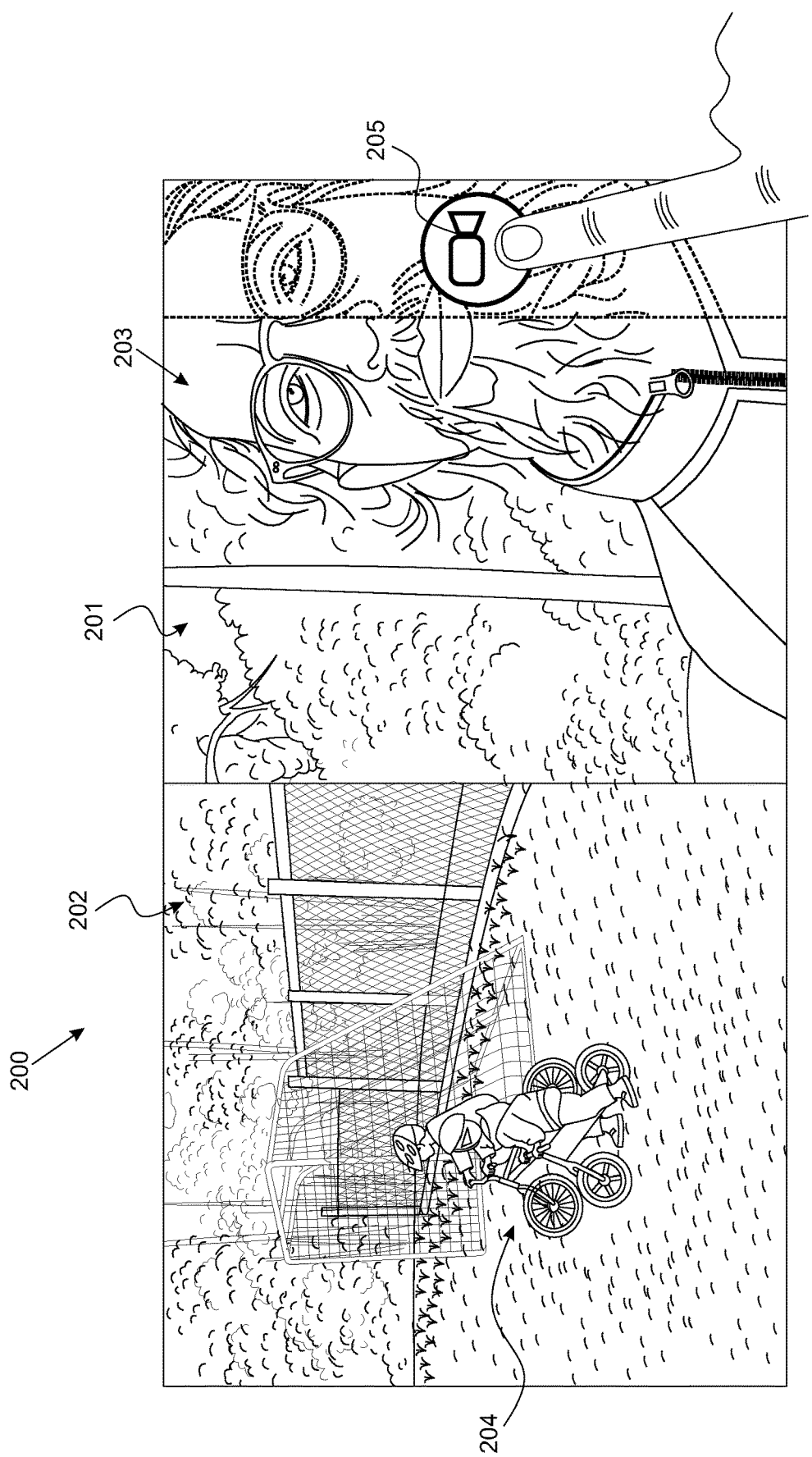
FIG. 2 shows an example user interface for contemporaneous capture of first and second video content in a first state.

Example FIG. 2 shows an example user interface 200, for contemporaneous capture of first and second video content, in a first state. Accordingly, FIG. 2 shows first video content 201 provided for display on a right side, which happens to be being captured by a front facing camera. The first video content 201 is of first action, which in this example comprises the user 203 operating the device 110. It will be appreciated that the first action includes anything that may or may not be occurring within the view of the camera that captured the first video content 201. Next to the first video content 201, second video content 202 is present on the left side, which happens to be being captured by a rear facing camera. The second video content is of second action in front of the user 203 and, in particular, of two children 204 riding their bicycles. It will be appreciated that the second action includes anything that may or may not be occurring within the view of the camera that captured the second video content 202. It will also be appreciated that the first and second video content from the different cameras may be arranged differently in the interface 200.

The apparatus 100 and/or the device 110 may provide the interface 200. The interface may include a "Begin Recording" graphic 205 for actuation on a touch sensitive display whereupon actuation, the first and second video content 201, 202 is captured contemporaneously. The apparatus 101 and/or device 110 may provide for capture from both cameras simultaneously. The device 110 and/or apparatus 100 may provide for display of the interface 200. Further, the device 110 and/or apparatus 100 may provide for recording of the first and second video content 201, 202 to form the composite video content, which, when played back shows the first and second video content at the same time on a display. It will be appreciated that in other examples, the device 110 may be configured to begin recording based on actuation of a physical button of the device 110 rather than the graphic 205. In other examples, the device 110 may be configured to receive a voice command or gesture or any other form of user-input to begin recording. In the description that follows, the provision of user input is illustrated as being provided to the interface 200, as it may be provided on a touch sensitive display. However, it will be appreciated that, as in this example, the apparatus 100 or device 110 may be configured to perform the mentioned function based on other forms of user-input.

Figure 3:
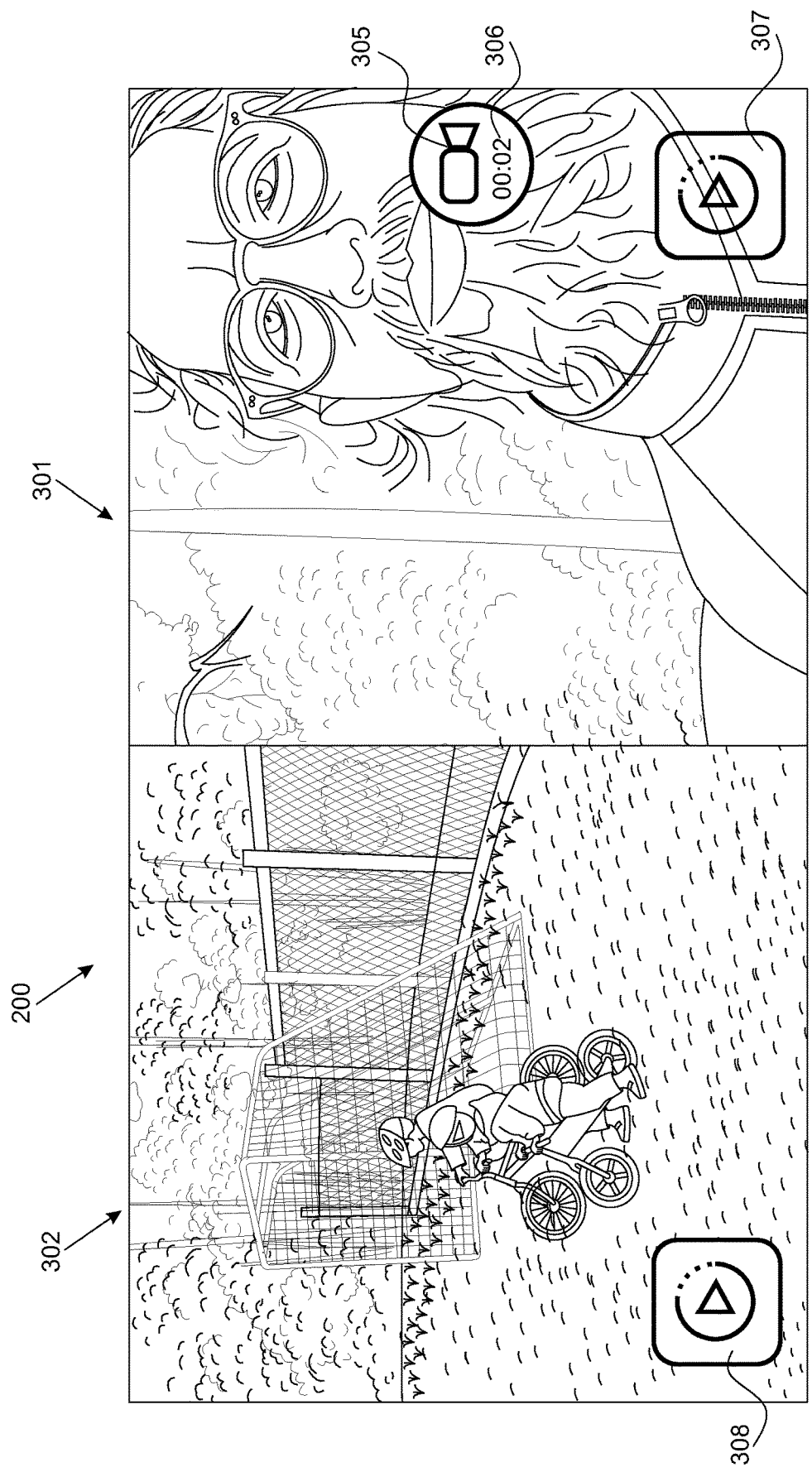
FIG. 3 shows an example user interface for contemporaneous capture of first and second video content in a second state.

Example FIG. 3 shows the interface 200 in a second state. The graphic 205 has been replaced with a second graphic 305 indicative of the video imagery being recorded to provide feedback to the user. The second graphic 305 may include a time counter 306 to show for how long the first and second video content has been captured.

A first preview 301 is provided for display. The first preview 301 comprises the live, captured video imagery of the first video content presented as it is captured, subject to any inherent processing delays caused, for example, by the processing of the imagery from the camera to form an image and the rendering of the image on the display. Accordingly, the first preview 301 is configured to show the user what is being captured at the current time, subject to the above-mentioned inherent processing delays.

A second preview 302 is provided for display. The second preview 302 comprises the live, captured video imagery of the second video content presented as it is captured, subject to any of the above-mentioned inherent processing delays. Accordingly, the second preview 302 is configured to show the user what is being captured at the current time, subject to the above-mentioned inherent processing delays.

The interface 200 and the apparatus 100 may therefore be considered to be in a real-time mode as both the first and second previews 301, 302 show the imagery of the video content at a real-time speed.

The interface 200 of example FIG. 3 includes user-actuatable slow-motion input graphics 307, 308 each associated with one of the first and second video content and, in particular, one of the first and second preview. Accordingly, the apparatus 100 may include means configured to provide for display of a first user-actuatable slow-motion input graphic 307, which upon user-actuation is configured to provide for selection of the first video content shown in first preview 301 for playback in slow-motion. In one or more examples, the apparatus 100 may include means configured to provide for display of a second user-actuatable slow-motion input graphic 308, which upon user-actuation is configured to provide for selection of the second video content for playback in slow-motion. It will be appreciated that in other examples, the capture of or the presentation of only one of the first and second video content may be possible or permitted and, accordingly, only one user-actuatable slow-motion input graphic 307, 308 may be provided for display. The apparatus 100 may be configured to provide for activation of a slow-motion mode in which only one of the first and second video content is provided in slow-motion based on user input associated with a respective one of the previews 301, 302, cameras (not shown) or graphics 307, 308, for example.

Figure 4:
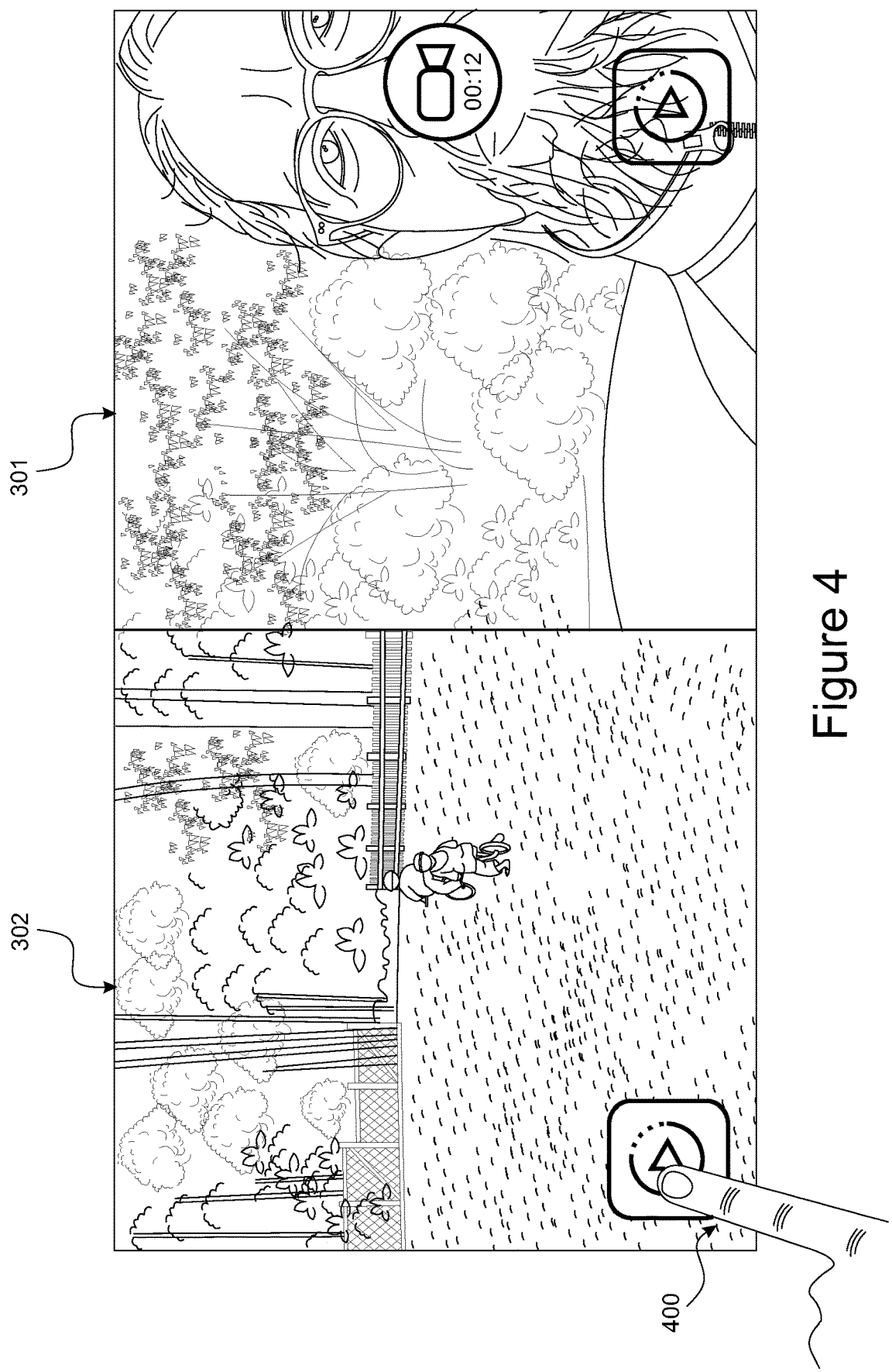
FIG. 4 shows an example user interface for contemporaneous capture of first and second video content in a third state.

Example FIG. 4 shows a user-actuation 400 of the second user-actuatable slow-motion input graphic 308. The user-actuation 400 comprises a slow-motion-mode input indicative of a request to the apparatus 100 to provide only a selected one of the first and second video content for playback in slow-motion. Accordingly, the second video content shown in the second preview 302 is presented in slow motion while the first video content is shown in the first preview 301 at normal speed. In one or more examples, the second video content may also be recorded such that it will be presented in slow motion on subsequent playback.

To summarise, the apparatus 100 comprising means configured to provide the first and second preview 301, 302 wherein one of the first and second video content is presented in slow motion based on the following;
  (i) first video content that is being captured by a first camera of the device 110
  (ii) second video content that is being captured by a second camera of the same device 110, wherein, as mentioned above, the first and second video content is captured contemporaneously; and
  (iii) the slow-motion-mode input 400 indicative of a request to provide only a selected one of the first and second video content for playback in slow-motion.

In this example, by virtue of the user actuation of the second user-actuatable slow-motion input graphic 308, associated with the second preview 302, the second video content comprises the selected video content and, accordingly, the first video content comprises the non-selected video content.

The apparatus 100 may thus provide for display of the first preview 301 comprising video imagery of the non-selected, first video content as it is captured (subject to any processing delays) to thereby provide a live, i.e. "as it happens", preview of what is being captured. The first video content of the first preview is presented at a first play rate substantially equal to a capture rate at which the non-selected video content was captured. Accordingly, the rate at which the first action occurred is the same as the rate at which the action is presented in the first preview. Thus, the first preview 301 may be considered as being presented at a real-time rate.

The apparatus 100 provides for display of the second preview 302 comprising video imagery of the selected, second video content presented at a second play rate slower than a capture rate at which the selected video content was captured. Accordingly, the rate at which the second action of the children 204 is presented in the second preview is less than the rate at which it occurred when captured. Thus, the second preview 302 may be considered as being presented at a slow motion rate.

The aforementioned first play rate, second play rate and the capture rate may refer to the rate at which the action occurred that is captured/presented. Video imagery is typically captured at a particular frame rate comprising the number of images that are captured over unit time to provide for the moving, video imagery. Accordingly, the first play rate, second play rate and the capture rate may comprise frame rates.

In order to provide the slow motion second preview 302, the second play rate and capture rate of the second video content may be adapted in various ways. For example, the apparatus 100 may provide for increasing of the rate at which the video imagery of the selected second video content is captured from a first (e.g. normal) rate to a second, greater rate, and the playback rate is maintained at the first rate. Thus, the same number of frames per second may be presented at playback, but more frames per second may be captured, thereby providing the slow motion effect.

In another example, the rate at which the video imagery of the selected, second video content is captured comprises a first rate, and the apparatus provides for configuring of the selected, second video content for playback at a third rate, slower than the first rate. Thus, there may be no change in the number of frames captured per second but the second preview 302 comprises the second video content presented with a fewer number of frames per second (i.e. the third rate).

In another example, there may be combination of increasing the frame rate at which the content is captured as well as slowing the frame rate with which it is presented. Thus, the apparatus 100 may be configured to provide for increasing of the rate at which the video imagery of the selected, second video content is captured from a first (e.g. normal) rate to a second, greater, rate and configuring the selected, second video content for playback at a third rate, slower than the first rate.

Accordingly, to summarise, the provision of slow motion video content for display as the second preview 302 may involve, exclusively one of, or both of, capturing more imagery of the action per unit time and displaying less imagery of the captured action per unit time.

The apparatus 100 may, in addition to providing said first and second preview 301, 302 on activation of the slow-motion-mode, provide for recording, such to a storage medium, of the composite video comprising the first and second video content. The composite video comprises the first and second video content configured to playback together at the same time on the same display, for example. The non-selected first video content of the composite video content is recorded such that it is configured for playback at the first play rate comprising the rate at which it was captured i.e. at real-time, normal speed. The selected video content of the composite video content is recorded such that it is configured for playback at the second play rate such that it is presented in slow motion.

Figure 5:
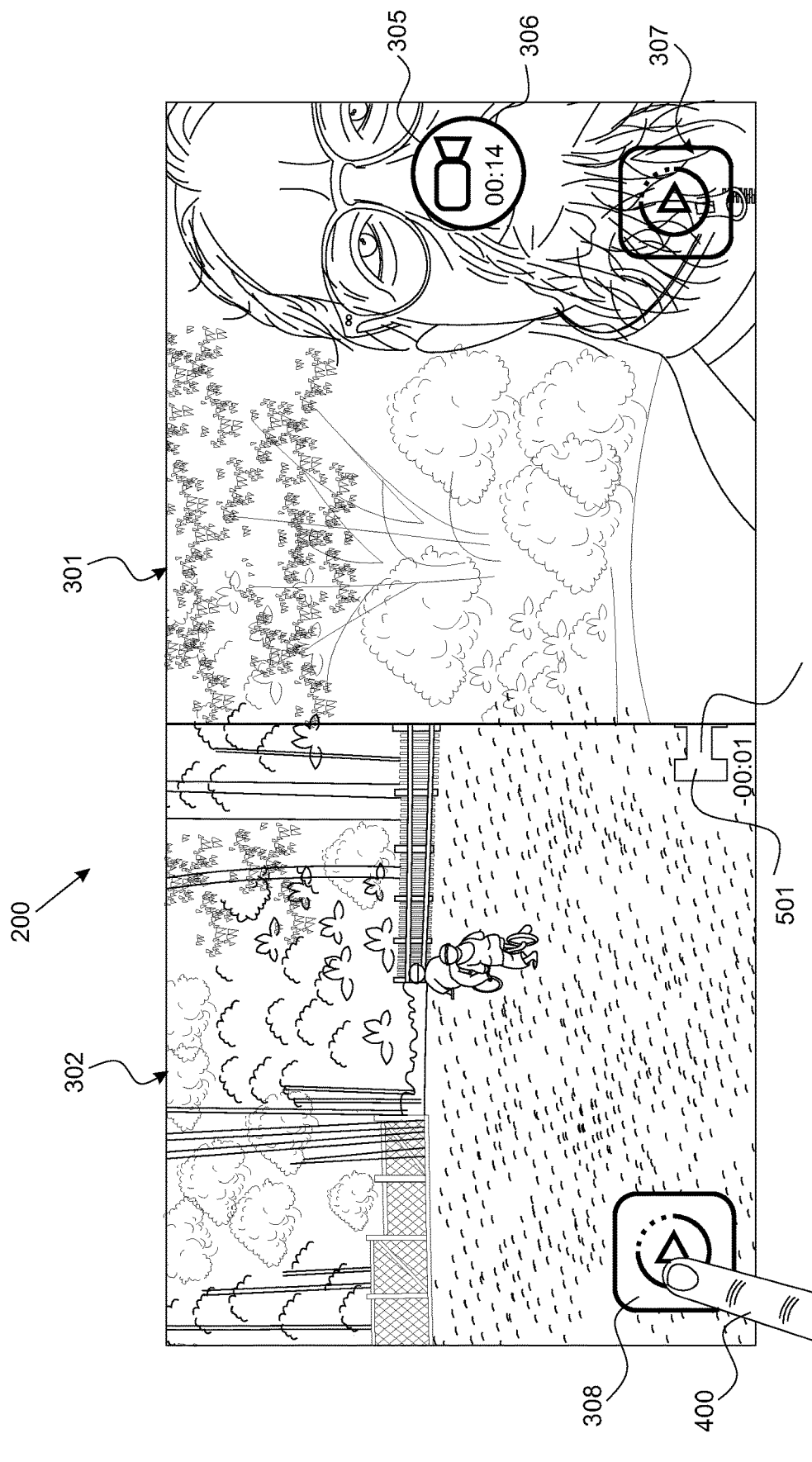
FIG. 5 shows an example user interface for contemporaneous capture of first and second video content in a fourth state.

Example FIG. 5 shows the continued provision of the slow-motion-mode input 400 and therefore the slow-motion-mode. In this example, the apparatus 100 is configured to provide the slow-motion-mode for the period of time the user actuates one of the graphics 307, 308. In other examples, the interface may be configured to provide the slow-motion-mode based on a first actuation and release and cease provision of the slow-motion-mode based on a second, distinct, actuation.

Given that the action captured as the first and second video content is occurring in real-time but the selected, second, video content is presented in the second preview 302 at a rate slower than real-time, a temporal offset between the first and second video content as presented in the previews 301, 302 will occur and increase for as long as the slow-motion mode is active. Thus, a time point in the most recently presented video imagery of the second video content will become further and further behind real-time while the slow-motion mode is active.

In one or more examples, the apparatus 100 may be configured to provide for display of a graphical indicator 500 illustrative of a temporal offset how far behind real-time the selected video content is. Thus, the temporal offset may comprise the different between a timestamp associated with the video imagery of the selected video content that is currently provided for display and a timestamp associated with the selected video imagery currently being captured. In the example FIG. 5, the graphical indicator 500 comprises a bar, wherein the length of the bar extending from a point between the first and second preview 301, 302 is indicative of the temporal offset. The bar includes a slider 501, which may be controlled as described below. Further, the graphical indicator 500 may show the temporal offset in terms of the number of seconds, which, in this example is "−00:01", i.e. 1 second. Thus, the action presented in the second preview 302 occurred 1 second prior to the action presented in the first preview 301 (because the first preview shows live content). The duration of the capture of first and second video content is 14 seconds as shown by the second graphic 305 and time counter 306.

Figure 6:
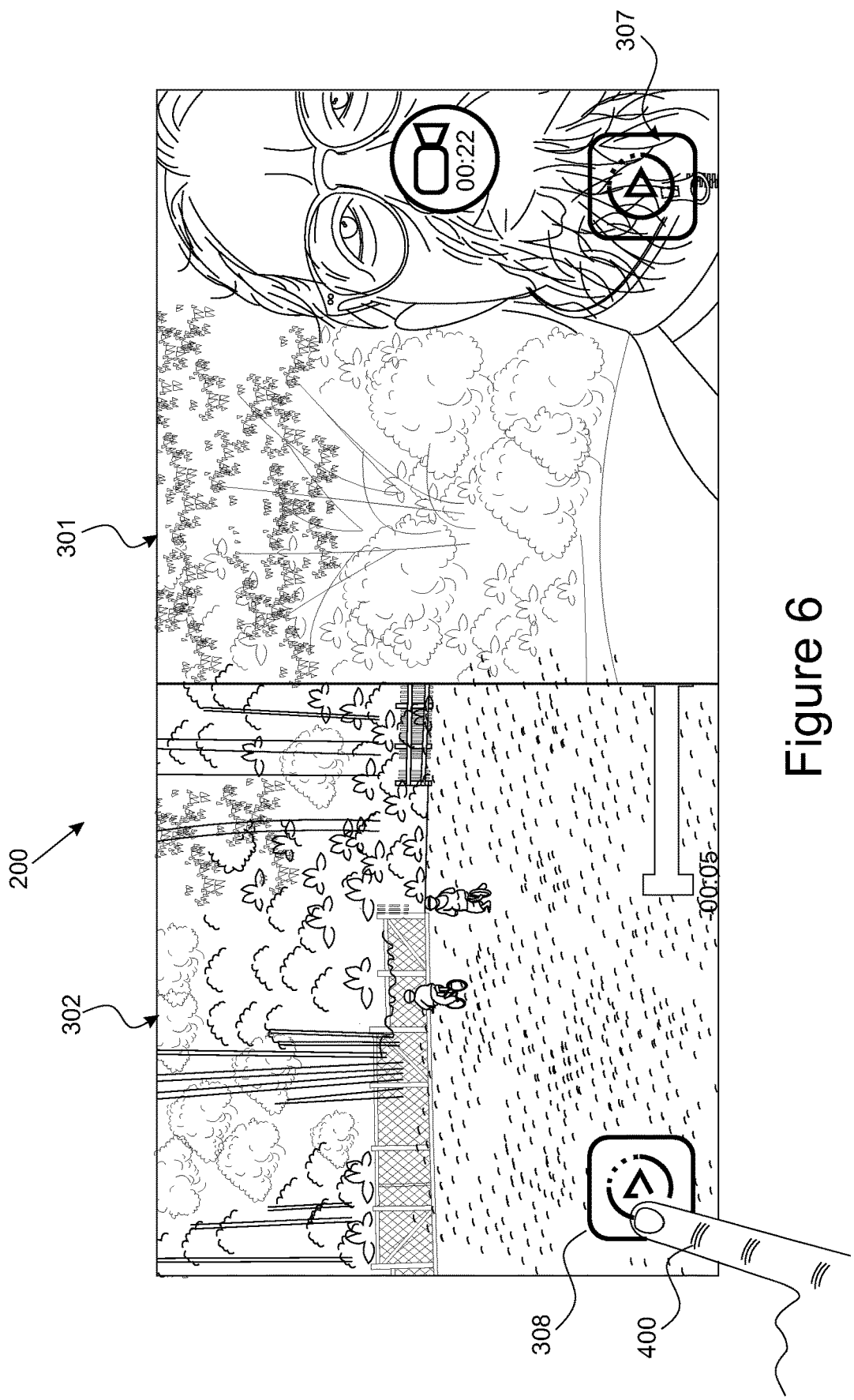
FIG. 6 shows an example user interface for contemporaneous capture of first and second video content in a fifth state.

Example FIG. 6 shows the continued provision of the slow-motion-mode input 400. Accordingly, the bar of the graphical indicator 500 has increased in length and now indicates a 5 second temporal offset between the first and second video content presented in the first and second preview 301, 302. The duration of the capture of first and second video content is 22 seconds as shown by the second graphic 305 and a time counter 306.

Figure 7:
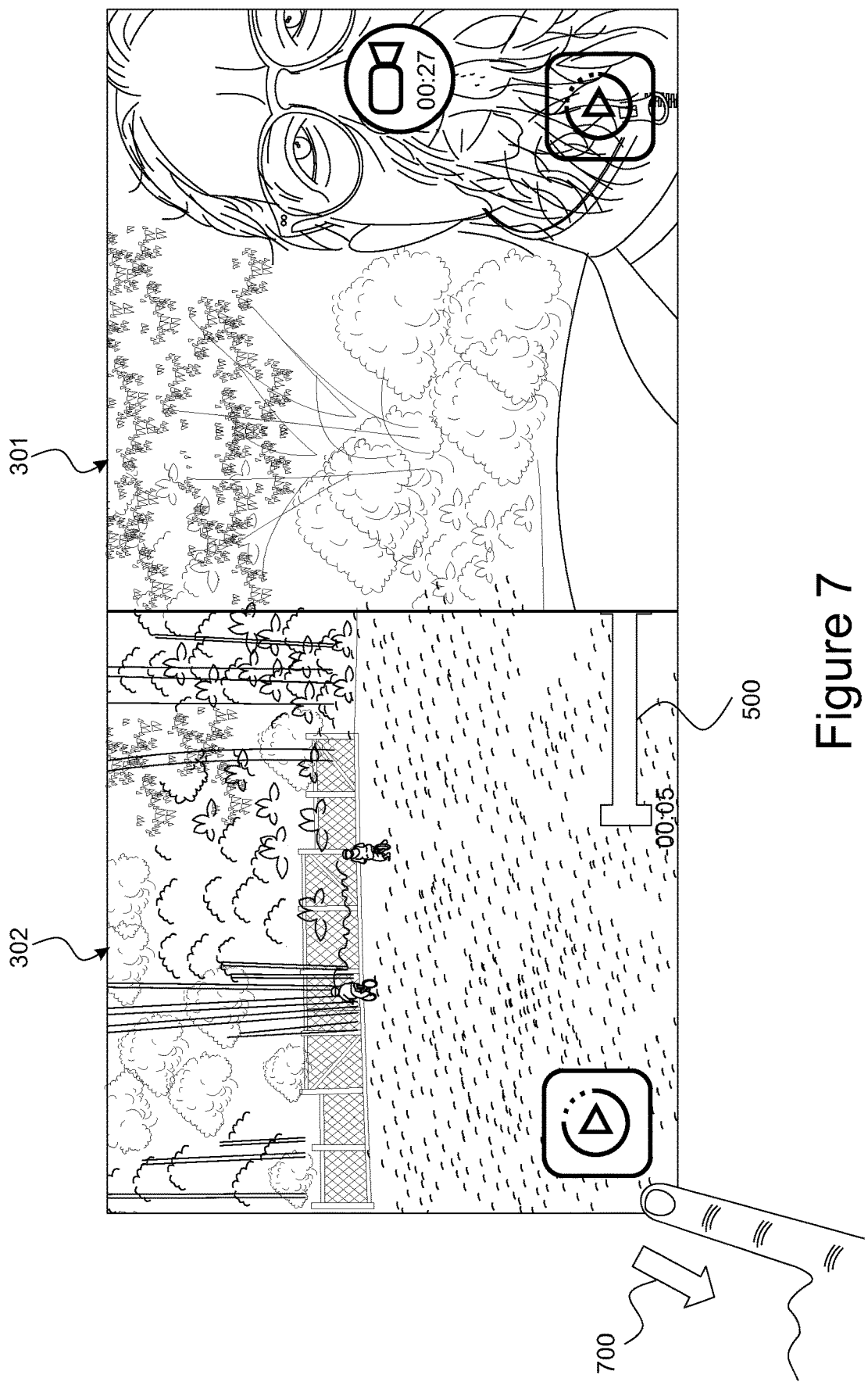
FIG. 7 shows an example user interface for contemporaneous capture of first and second video content in a sixth state.

Example FIG. 7 shows the stopping 700 of the slow-motion-mode input 400. The apparatus 100 may provide for capture of the first video content at the same rate at which it is presented in the first preview 301. The apparatus 100 may provide for capture of the second video content at the substantially the same rate at which it is presented in the second preview 302. The apparatus 100 may be considered to return to the real-time mode.

It will be appreciated that the temporal offset may still exist, although it will not be increasing, even upon stopping of the slow-motion-mode input 400. In one or more examples, not represented in FIG. 7, the apparatus 100, upon ending of the slow-motion-mode input, may be configured to present the first video content and the second video content in time synchrony and live, i.e. as the content is captured.

Thus, in one or more examples, the apparatus 100 may provide for reduction of the temporal offset, either instantaneously or incrementally by fast-forward playback, based on removal of the slow-motion-mode input 700.

In other examples, as represented here, the apparatus 100 may be configured to present the first and second video content with the temporal offset that was accrued by the time the slow-motion-mode input ended and provide for control of the temporal offset based on user-input.

Figure 8:
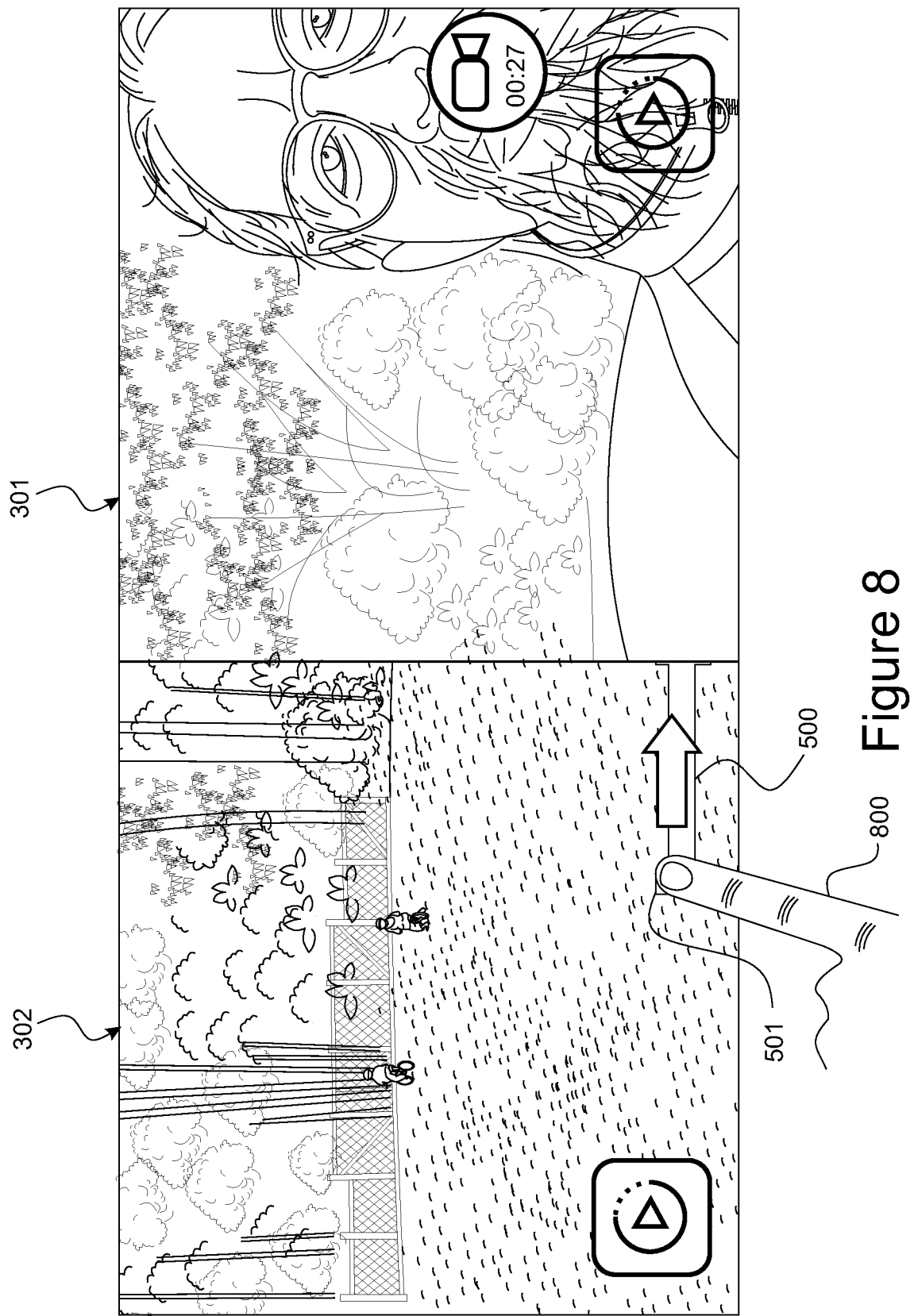
FIG. 8 shows an example user interface for contemporaneous capture of first and second video content in a seventh state.

Example FIG. 8 shows user input 800 directed towards control of the temporal offset. Such user input may be provided in any appropriate way, but in this example, the apparatus 100 is configured to receive said user input based on user-input directed towards the graphical indicator 500 and, in particular, to the slider 501 (mostly hidden from view by the finger of input 800). FIG. 8 shows the user input 800 sliding the slider of the graphical indicator 500 to the right, which in this example is indicative of a desire to reduce the temporal offset between the first preview 301 and the second preview 302.

Figure 9:
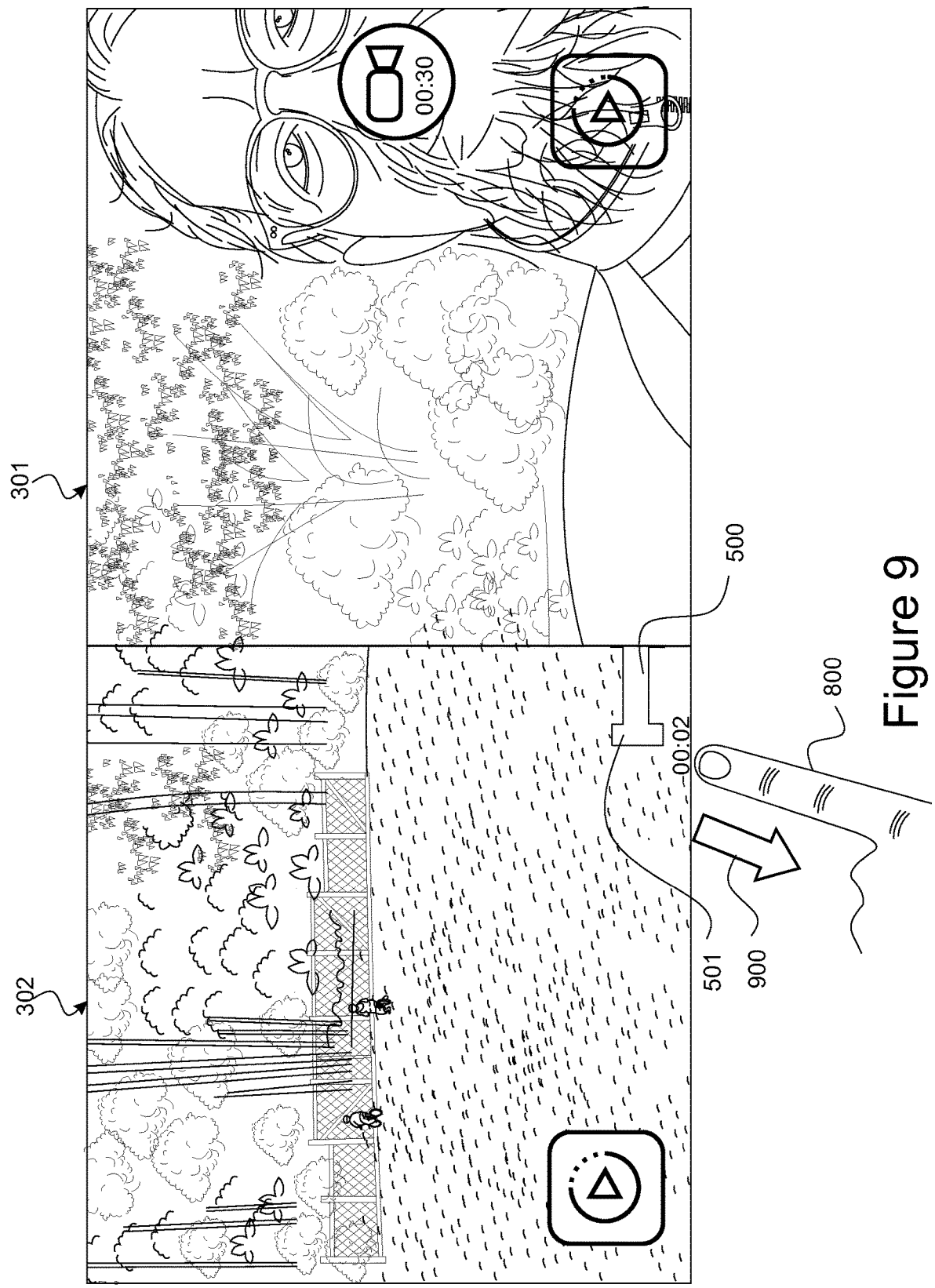
FIG. 9 shows an example user interface for contemporaneous capture of first and second video content in a eighth state.

Example FIG. 9 shows user input 800 having being removed (shown by arrow 900) and the apparatus 100 having adjusted the temporal offset between the first video content presented in the first preview 301 and the second video content presented in the second preview 302 to 2 seconds, as shown by the graphical indicator 500.

Accordingly, in summary, user input 800 directed to the graphical indicator 500 (or other suitable user-input indicative of a desire to change the temporal offset) provides for adjustment of the temporal offset between the video content shown in the first preview 301 and the second preview 302 and based on said user input 800 to select a new temporal offset (by, for example, removal of the sliding action shown by 900), the apparatus 100 may be configured to provide for changing of the second preview 302 to present the selected video content at the new time point (−2 seconds relative to the first video content in this example).

It will be appreciated that the apparatus 100 may provide for an instantaneous (save for processing delays) change in the time point shown in the second video content from imagery associated with the original temporal offset to imagery associated with the new temporal offset. In other examples, based on the user input 800 and/or 900 to select the new time point, the apparatus 100 may provide for presentation (as the second preview 302 in this example) of the selected video content at a play rate greater than the capture rate (e.g., fast-forward playback) at least until a time corresponding to the new temporal offset in the selected video content is reached. Thus, the selected video content may be played back at a faster than real-time speed to reduce the temporal offset to the new temporal offset.

Figure 10:
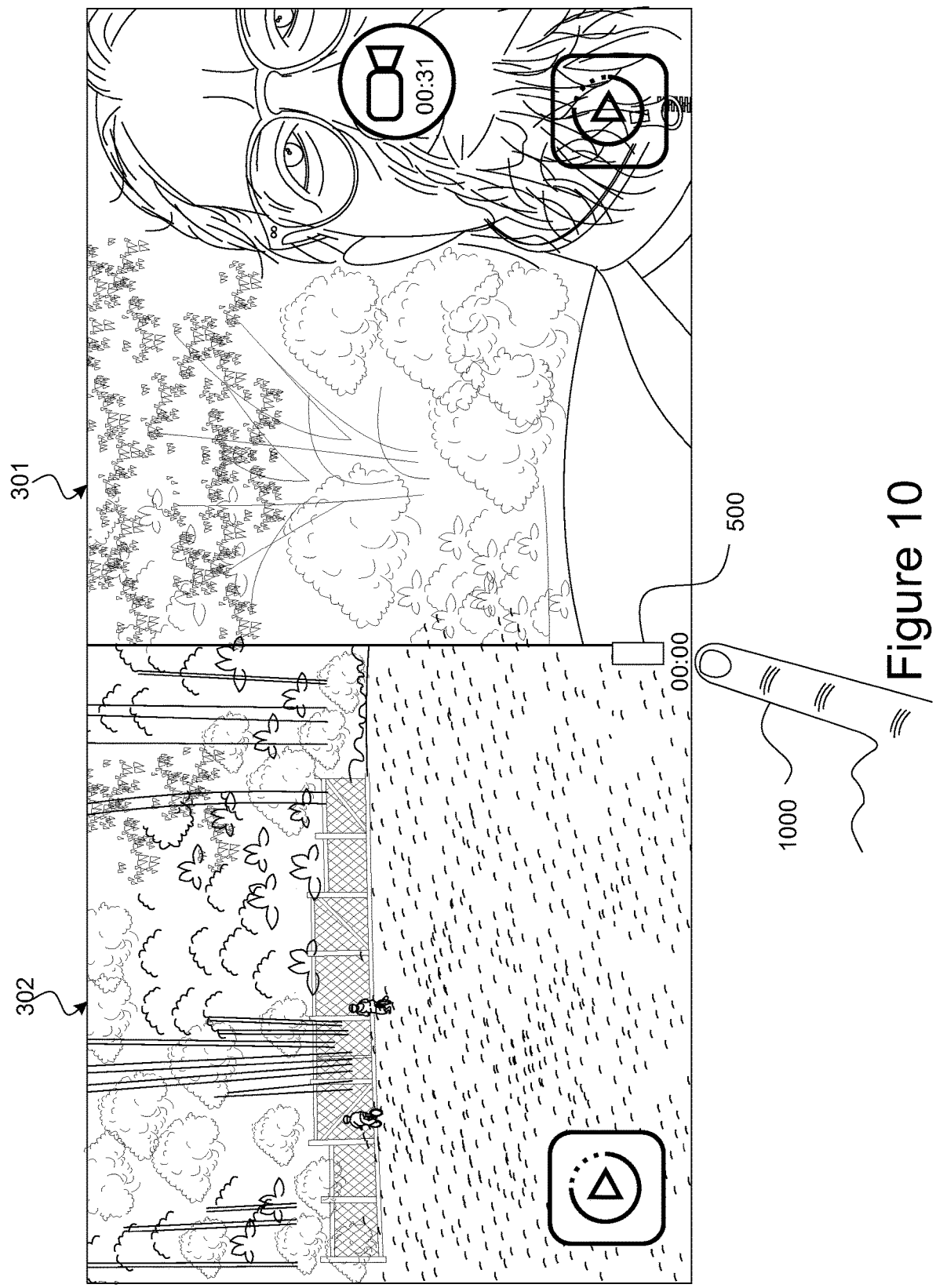
FIG. 10 shows an example user interface for contemporaneous capture of first and second video content in a ninth state.

Example FIG. 10 shows the apparatus 100 having received a user input 1000 to remove the temporal offset by sliding the graphical indicator 500, in this example, to the centre position. Such a user input may be considered to be a request to temporally synchronize the first preview 301 and the second preview 302 such that contemporaneously captured video imagery from the first and second video content is shown in the first and second previews 301, 302 at the same time. Thus, based on an input 1000 indicative of a request to temporally synchronize the first preview 301 and the second preview 302, the apparatus 100 may provide for display of:

(i) the first preview 301 comprising live (save for processing delays) video imagery of the first video content as the first video content is captured; and (ii) the second preview 302 comprising live (save for processing delays) video imagery of the second video content as the second video content is captured.

The above description explains what may be displayed in the first and second preview 301, 302 based upon on adjustment of the temporal offset to a new temporal offset. In one or more examples, the apparatus 100 may be configured to provide for recording of the composite video content. Reduction of the temporal offset, which may include reduction of the temporal offset to zero and thereby synchronising the first and second video content may be recorded in various ways.

In some examples, the non-selected video content (the first video content in this example shown in preview 301) may be deemed the master video and is configured to be presented in full. Accordingly, on entering the slow-motion-mode the selected video content is recorded as slow-motion video content and, upon reduction of the temporal offset, the selected video content may "jump" to the video imagery corresponding to the new temporal offset thereby missing out captured, selected video content or the selected video content may be played at a faster than real-time rate so that the selected video content catches up with the non-selected video content and the video imagery corresponding to the new temporal offset is provided for presentation.

Thus, in one or more examples, based on the presence of the temporal offset between the first preview 301 and the second preview 302 due to presentation of the selected video content at the slower, play rate than the capture rate at which it was captured while the non-selected video content was presented at a play rate substantially equal to the capture rate at which the non-selected video content was captured for a time period for which the slow-motion-mode was active; and based on a user input 800, 900 to select a new temporal offset;

provide for recording of the first and second video content as composite video content for playback of the first and second video content together; wherein (i) the selected video content is recorded with a discontinuity corresponding to the time period in the selected video content between the first temporal offset and the new temporal offset; and (ii) the selected video content of the composite video content is recorded such that the selected video content is configured for playback at a catch-up-play-rate greater than the capture rate at least until a time point in the selected video content that corresponds to the new temporal offset is reached.

Figure 11:
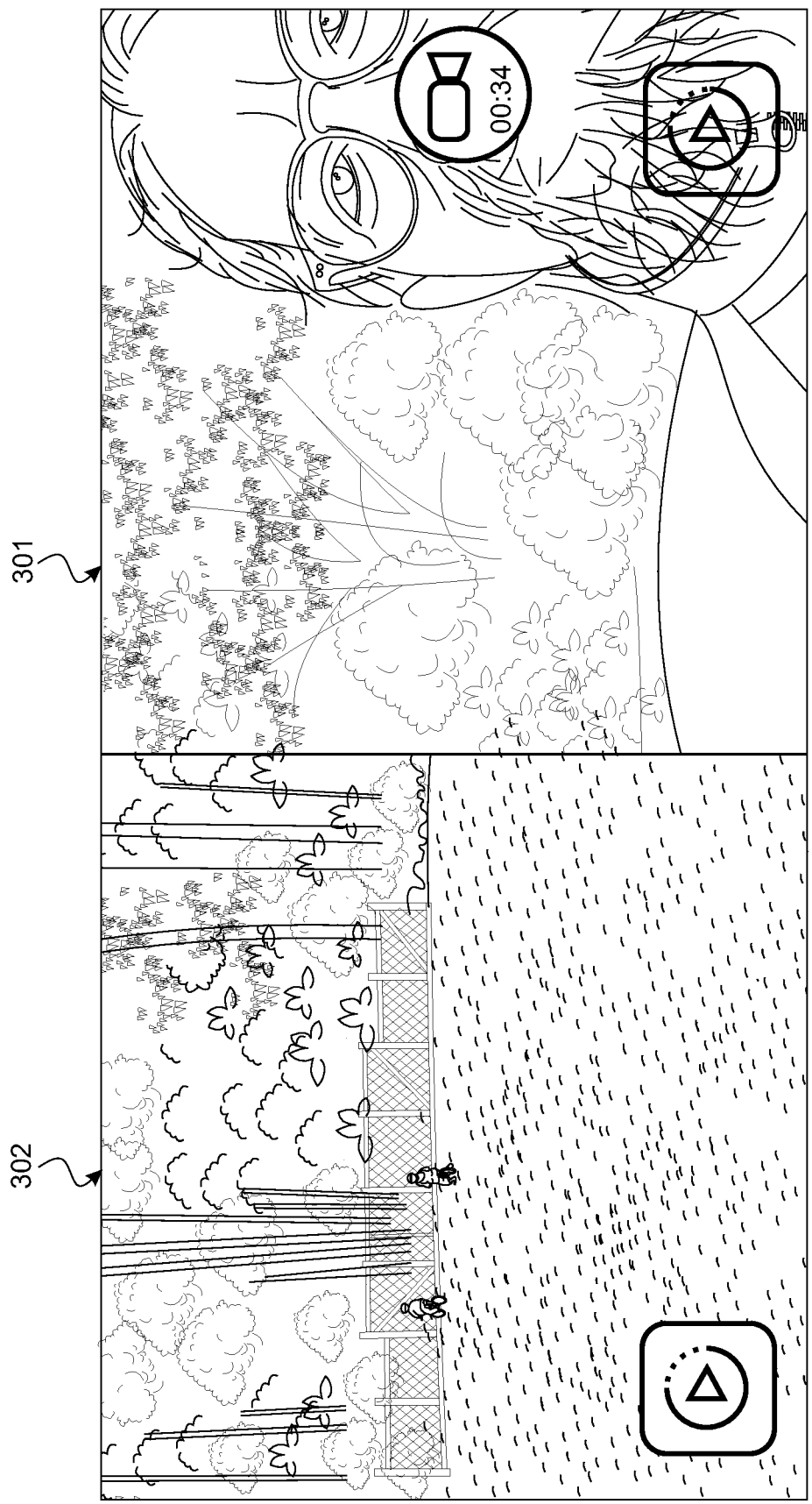
FIG. 11 shows an example user interface for contemporaneous capture of first and second video content in a tenth state.

Example FIG. 11 shows the first video content shown in the first preview 301 and the second video content shown in the second preview 302 in synchronisation in terms of real-time play rate and contemporaneously captured video imagery. In this example, the graphical indicator 500 is removed from display based on there being no current, temporal offset.

Video content typically has audio content associated therewith. When the first video content and second video content is captured by two different cameras, which may be part of the same device 110, the capture and assignment of audio to each of the video content may be difficult.

In one or more examples, the device 110 may be configured to capture spatial audio comprising audio captured with information indicative of the direction from which the audio was captured. With this directional information, which may be indicative of the angle from which the audio arrived or a determined location of the source of the audio, the apparatus 100 and/or device 110 may be configured to associate some of the captured audio content with the first video content and some of the captured audio content with the second video content. Accordingly, the apparatus 100 and/or device may further have access to video direction information indicative of the direction in which the first video content and second video content is captured, which can be correlated with the direction information of the captured spatial audio. Thus, the apparatus 101 may comprises means configured to perform the following:

associate, with the first video content, a first subset of the spatial audio having direction information corresponding to the direction in which the first video content was captured; and associate, with the second video content, a second subset, different to the first subset, of the spatial audio having direction information corresponding to the direction in which the second video content was captured.

The association of the audio content and video content may include recording and/or encoding the video and audio content together, as appropriate. It will be appreciated that video content, comprising video imagery and audio, may be encoded/recorded in different ways and therefore the association of the subsets of audio content with the video imagery of the first and second video content comprises association such that the video imagery and audio are configured to be presented together on subsequent playback.

It will be appreciated that the audio content associated with the selected video content of the first and second video content may also be presented at a corresponding slower speed in the slow-motion-mode.

While some of the captured audio content may have directional information, other audio may be diffuse in that it does not have a determined specific direction from which it arrived because it was received from a wide range of directions (e.g. greater than a threshold) or all directions. For the so-called diffuse audio of the captured audio content, the apparatus may be configured to determine the play back and/or capture rate based on a user-preference or in accordance with a predetermined setting. This is because the diffuse audio is typically the same for both the first and second audio content. Therefore, in one or more examples, the apparatus 100 may provide for play back of the diffuse audio at a rate corresponding to the non-selected video content, i.e., the video content that is being captured real-time.

Figure 12:
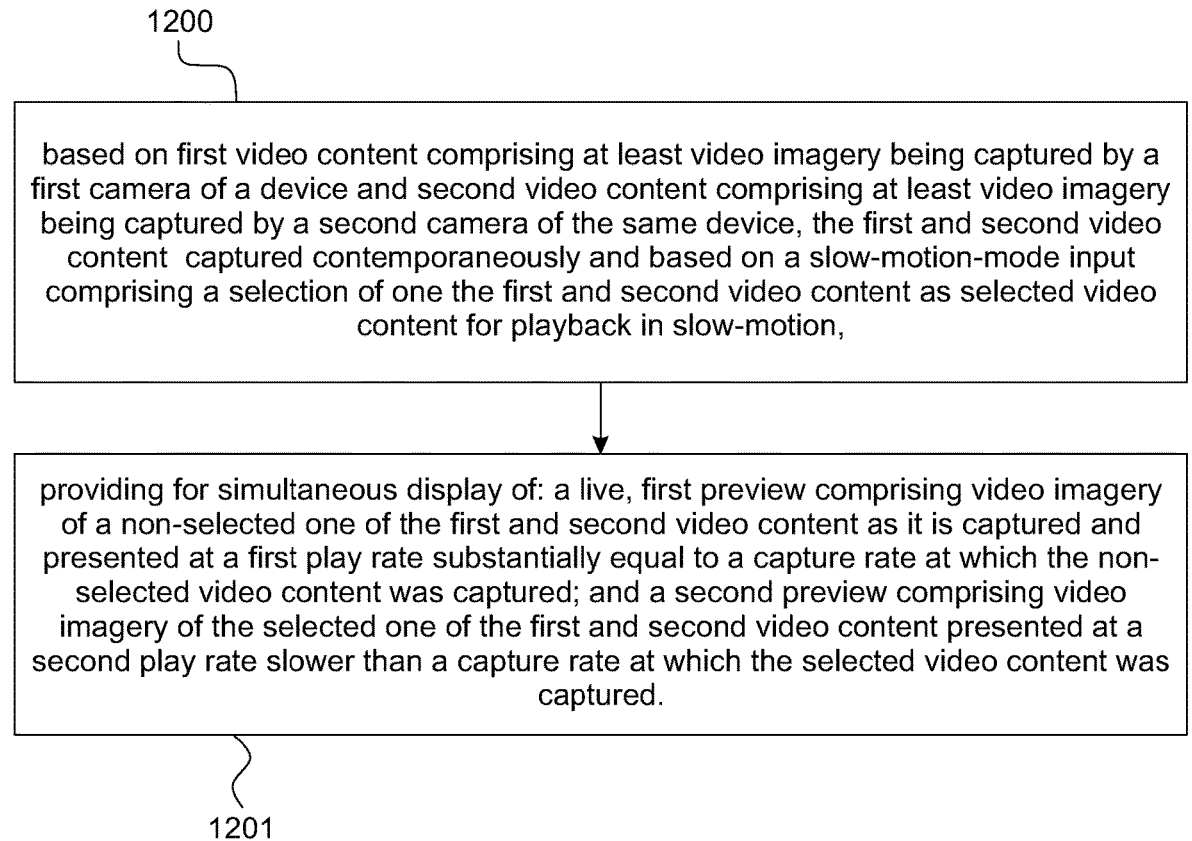
FIG. 12 shows a flowchart illustrating an example method.

FIG. 12 shows a flow diagram illustrating the steps of, based on 1200 first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, providing for simultaneous display 1201 of: a live, first preview comprising video imagery of a non-selected one of the first and second video content as it is captured and presented at a first play rate substantially equal to a capture rate at which the non-selected video content was captured; and a second preview comprising video imagery of the selected one of the first and second video content presented at a second play rate slower than a capture rate at which the selected video content was captured.

Figure 13:
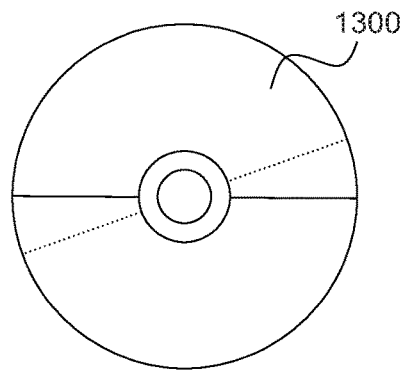
FIG. 13 shows a computer readable medium.

FIG. 13 illustrates schematically a computer/processor readable medium 1300 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, comprising:
   at least one processor; and
   at least one memory including computer program code;
   the at least one memory and the computer program code being configured to, with the at least one processor, cause the apparatus at least to:
   based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, provide for simultaneous display of:
      a live, first preview comprising video imagery of a non-selected one of the first and second video content as it is captured and presented at a first play rate substantially equal to a capture rate at which the non-selected video content was captured; and
      a second preview comprising video imagery of the selected one of the first and second video content presented at a second play rate slower than a capture rate at which the selected video content was captured; and
   provide for display of a graphical indicator illustrative of a temporal offset comprising an amount of time the selected video content currently provided for display as the second preview is behind the first preview.

2. The apparatus according to claim 1, wherein the at least one memory and the computer program code are further configured to, with the at least one processor, cause the apparatus to provide for recording of the first and second video content as composite video content for playback of the first and second video content together, wherein:
   the non-selected video content of the composite video content is configured for playback at the first play rate; and
   the selected video content of the composite video content is configured for playback at the second play rate.

3. The apparatus according to claim 1, wherein user input directed to the graphical indicator provides for adjustment of the temporal offset between first and second video content presented as the first preview and the second preview and based on said user input to select a new temporal offset, the at least one memory and the computer program code being further configured to, with the at least one processor, cause the apparatus to perform one of the following:
   provide for changing of the second preview to present the selected video content corresponding to the new time point; and
   provide for presentation, as the second preview, of the selected video content at a play rate greater than the capture rate at least until video imagery of the selected video content that corresponds to the new time point is reached.

4. The apparatus according to claim 1, wherein the at least one memory and the computer program code are further configured to, with the at least one processor, cause the apparatus to, based on an input indicative of a request to cease provision of the selected video content for playback in slow-motion, provide for display of the second preview comprising video imagery of the selected video content presented at a play rate substantially equal to the capture rate at which the selected video content was captured.

5. The apparatus according to claim 1, wherein the at least one memory and the computer program code are further configured to, with the at least one processor, cause the apparatus to, based on an input indicative of a request to temporally synchronize the first preview and the second preview, provide for display of:
   the first preview comprising live video imagery of the first video content as the first video content is captured; and
   the second preview comprising live video imagery of the second video content as the second video content is captured.

6. The apparatus according to claim 1, wherein the at least one memory and the computer program code are further configured to, with the at least one processor, cause the apparatus to:
   based on the presence of the temporal offset between the first preview and the second preview due to presentation of the selected video content at the slower, second play rate than the capture rate at which it was captured while the non-selected video content was presented at the first play rate substantially equal to the capture rate at which the non-selected video content was captured and a time for which the slow-motion-mode was active; and
   based on a user input to select a new temporal offset less than a first temporal offset, the first temporal offset comprising the temporal offset at the time said user input was provided;
   provide for recording of the first and second video content as composite video content for playback of the first and second video content together, wherein
   (i) the selected video content is recorded with a discontinuity corresponding to the time period in the selected video content between the first temporal offset and the new temporal offset; or
   (ii) the selected video content is recorded such that the selected video content is configured for playback at a catch-up-play-rate greater than the capture rate at least until a time point in the selected video content that corresponds to the new time point is reached.

7. The apparatus according to claim 1, wherein the device is configured to capture spatial audio comprising audio captured with information indicative of the direction from which the audio was captured, and based on video direction information indicative of the direction in which the first video content and second video content is captured, and wherein the at least one memory and the computer program code are further configured to, with the at least one processor, cause the apparatus to perform the following:
   associate, with the first video content, a first subset of the spatial audio having direction information corresponding to the direction in which the first video content was captured; and
   associate, with the second video content, a second subset, different to the first subset, of the spatial audio having direction information corresponding to the direction in which the second video content was captured.

8. The apparatus according to claim 1, wherein the first video content and the second video content each comprise associated audio content and in the first preview, the audio associated with the non-selected video is provided for presentation at the first play rate substantially equal to a capture rate at which the audio associated with the non-selected video was captured; and the audio associated with the selected video is provided for presentation at the second play rate slower than a capture rate at which the audio associated with the selected video was captured.

9. The apparatus according to claim 1, wherein the first video content and the second video content each comprise associated audio content and in the first preview, the audio associated with the non-selected video is recorded and configured for presentation at the first play rate substantially equal to a capture rate at which the audio associated with the non-selected video was captured; and the audio associated with the selected video is recorded and configured for presentation at the second play rate slower than a capture rate at which the audio associated with the selected video was captured.

10. The apparatus according to claim 1, wherein the first video content and the second video content each comprise associated audio content and based on a user-audio-selection-input that identifies one of the first and second video content, and wherein the at least one memory and the computer program code are further configured to, with the at least one processor, cause the apparatus to present, in terms of the associated audio, the audio associated with only the video content selected by the user-audio-selection-input.

11. The apparatus according to claim 1, wherein the first video content and the second video content are each associated with directional audio content and diffuse audio content and wherein one of said first and second video contents is selected and the other is non-selected, and wherein:
the directional audio content associated with the selected video content is provided for presentation at a play rate based on the play rate of the selected video content;
the directional audio content associated with the non-selected video content is provided for presentation at a play rate based on the play rate of the non-selected video content; and
the diffuse audio content associated with the first and second video contents is provided for presentation at a play rate based on the play rate of the non-selected video content.

12. The apparatus according to claim 1, wherein the at least one memory and the computer program code are further configured to, with the at least one processor, cause the apparatus to provide for display, at least prior to receipt of the slow-motion-mode input, of a first user-actuatable slow-motion input graphic, which upon user-actuation is configured to provide for selection of the first video content for playback in slow-motion and a second user-actuatable slow-motion input graphic, which upon user-actuation is configured to provide for selection of the second video content for playback in slow-motion.

13. The apparatus according to claim 1, wherein the presentation of the second preview at a play rate slower than the capture rate at which the selected video content was captured is provided by one of:
based on the slow-motion-request input, increasing the rate at which the video imagery of the selected video content is captured from a first rate to a second, greater, rate, the selected video content configured for playback at the first rate;
based on the slow-motion-request input, and wherein the rate at which the video imagery of the selected video content is captured comprises a first rate, configuring the selected video content for playback at a third rate, slower than the first rate; and
based on the slow-motion-request input, increasing the rate at which the video imagery of the selected video content is captured from a first rate to a second, greater, rate and configuring the selected video content for playback at a third rate, slower than the first rate.

14. A method, comprising:
based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, providing for simultaneous display of:
a live, first preview comprising video imagery of a non-selected one of the first and second video content as it is captured and presented at a first play rate substantially equal to a capture rate at which the non-selected video content was captured; and
a second preview comprising video imagery of the selected one of the first and second video content presented at a second play rate slower than a capture rate at which the selected video content was captured; and
providing for display of a graphical indicator illustrative of a temporal offset comprising an amount of time the selected video content currently provided for display as the second preview is behind the first preview.

15. The method as claimed in claim 14, further comprising:
providing for recording of the first and second video content as composite video content for playback of the first and second video content together, wherein:
the non-selected video content of the composite video content is configured for playback at the first play rate; and
the selected video content of the composite video content is configured for playback at the second play rate.

16. The method as claimed in claim 14, wherein user input directed to the graphical indicator provides for adjustment of the temporal offset between first and second video content presented as the first preview and the second preview and based on said user input to select a new temporal offset, comprising one of the following:
providing for changing of the second preview to present the selected video content corresponding to the new time point; and
providing for presentation, as the second preview, of the selected video content at a play rate greater than the capture rate at least until video imagery of the selected video content that corresponds to the new time point is reached.

17. A non-transitory computer readable medium comprising computer program code stored thereon, the computer readable medium and computer program code being configured to, when run on at least one processor, perform a method comprising:
based on first video content comprising at least video imagery being captured by a first camera of a device and second video content comprising at least video imagery being captured by a second camera of the same device, the first and second video content captured contemporaneously and based on a slow-motion-mode input comprising a selection of one of the first and second video content as selected video content for playback in slow-motion, providing for simultaneous display of:

a live, first preview comprising video imagery of a non-selected one of the first and second video content as it is captured and presented at a first play rate substantially equal to a capture rate at which the non-selected video content was captured; and
a second preview comprising video imagery of the selected one of the first and second video content presented at a second play rate slower than a capture rate at which the selected video content was captured; and providing for display of a graphical indicator illustrative of a temporal offset comprising an amount of time the selected video content currently provided for display as the second preview is behind the first preview.

* * * * *